(12) United States Patent
Lin et al.

(10) Patent No.: US 11,514,889 B2
(45) Date of Patent: Nov. 29, 2022

(54) DEVICE AND METHOD FOR CLARIFYING DYSARTHRIA VOICES

(71) Applicant: National Chung Cheng University, Chia-Yi (TW)

(72) Inventors: Tay-Jyi Lin, Chia-Yi (TW); Che Chia Pai, Taipei (TW); Hsi Che Wang, New Taipei (TW); Ching-Wei Yeh, Chia-Yi (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 173 days.

(21) Appl. No.: 17/060,393

(22) Filed: Oct. 1, 2020

(65) Prior Publication Data

US 2022/0068260 A1 Mar. 3, 2022

(30) Foreign Application Priority Data

Aug. 31, 2020 (TW) ................. 109129711

(51) Int. Cl.
*G10L 15/06* (2013.01)
*G10L 15/22* (2006.01)
*G10L 15/07* (2013.01)

(52) U.S. Cl.
CPC ............ *G10L 15/063* (2013.01); *G10L 15/07* (2013.01); *G10L 15/22* (2013.01)

(58) Field of Classification Search
CPC ....... G10L 15/22; G10L 15/07; G10L 15/063; G10L 21/003; G10L 13/02
See application file for complete search history.

(56) References Cited

U.S. PATENT DOCUMENTS

| | | | | |
|---|---|---|---|---|
| 10,796,715 B1* | 10/2020 | Berisha | ................ | A61B 5/4848 |
| 11,273,778 B1* | 3/2022 | Lakhani | ................ | G06N 20/00 |
| 2008/0294019 A1* | 11/2008 | Tran | ...................... | G16H 40/63 600/301 |
| 2014/0195227 A1* | 7/2014 | Rudzicz | ................ | G10H 1/366 704/231 |
| 2016/0210982 A1* | 7/2016 | Sherman | .............. | G10L 21/003 |
| 2018/0197439 A1* | 7/2018 | Gordon | ................. | G09B 19/04 |
| 2020/0074987 A1* | 3/2020 | Bhat | ...................... | G10L 15/02 |
| 2020/0075160 A1* | 3/2020 | Agarwal | ................ | G16H 50/30 |
| 2021/0043188 A1* | 2/2021 | Candelore | ............ | G10L 13/033 |
| 2021/0093231 A1* | 4/2021 | Uribe | ...................... | A61B 5/11 |
| 2021/0241777 A1* | 8/2021 | Bladsy | ................... | G10L 17/14 |

* cited by examiner

*Primary Examiner* — Michael Colucci
(74) *Attorney, Agent, or Firm* — Muncy, Geissler, Olds & Lowe, P.C.

(57) ABSTRACT

A device and a method for clarifying dysarthria voices is disclosed. Firstly, a dysarthria voice signal is received and framed to generate dysarthria frames. Then, the dysarthria frames are received to retrieve dysarthria features. Finally, the dysarthria features are received. Without receiving phases corresponding to the dysarthria features, the dysarthria features are converted into an intelligent voice signal based on an intelligent voice conversion model. The intelligent voice conversion model is not trained by the dynamic time warping (DTW). The present invention avoids the phase distortion of the voice signal and provides more natural and clarified voices with low noise.

16 Claims, 9 Drawing Sheets
(2 of 9 Drawing Sheet(s) Filed in Color)

DEVICE AND METHOD FOR CLARIFYING DYSARTHRIA VOICES

This application claims priority for Taiwan patent application no. 109129711 filed on 31 Aug. 2020, the content of which is incorporated by reference in its entirely.

BACKGROUND OF THE INVENTION

Field of the Invention

The present invention relates to the technology for clarifying voices, particularly to a device and a method for clarifying dysarthria voices.

Description of the Related Art

Dysarthria patients are characterized by lisp because of the abnormalities in muscle strength and timbre and low speech speed while speaking, therefore it is hard for other people to understand the dysarthria patient's speech, which impacts the quality of the dysarthria patient's life. Most of the dysarthria patients include stroke patients, cerebral palsy patients, and Parkinson's disease patients. Although drugs for delaying neurodegeneration and rehabilitation treatments for improving muscle control have been developed, the treatment effects of the drugs and rehabilitation treatments vary from person to person, and usually do not improve the conditions substantially. Accordingly, researchers have proposed to use the voice conversion technology to convert the voices of patients into voices that normal people understand, thereby enhancing the clarity and comprehension of patients' voices.

The conventional voice conversion technology extracts the voice features of a dysarthria person and a target person, such a fundamental frequency, a Mel spectrum, and an aperiodicity. The conventional voice conversion technology derives conversion functions to convert dysarthria features into target features. Finally, a vocoder synthesizes the converted features into voices. Dysarthria voices have technical difficulties in extracting the voice features and deriving the conversion functions. Thus, the features to improve a dysarthria voice conversion system are implemented with log power spectrums and phases, wherein the log power spectrums and the phases are extracted using a Fourier transform. The log power spectrums are inputted to a pre-trained conversion model. The conversion model converts the log power spectrums into log power spectrums with enhanced comprehension without processing the remaining phases. The converted log power spectrums and the phases are synthesized into voices with enhanced comprehension using an inverse Fourier transform. In the conventional technology, the implemented results can obviously improve the comprehension of voices. However, the log power spectrums with enhanced comprehension converted by the conversion model have a mismatch with the un-processed phases, which causes the synthesized voices to have a lot of noise in subjective hearing.

Referring to FIG. 1 and FIG. 2, the conventional technology uses a deep neural network (DNN)-based voice conversion method to improve dysarthria voices. FIG. 1 is a schematic diagram illustrating a device for clarifying dysarthria voices in the conventional technology. FIG. 2 is a schematic diagram illustrating a voice training system in the conventional technology. The device 1 for clarifying dysarthria voices includes a normalizer 10, a framing circuit 11, a short time Fourier transformer 12, a normalizer 13, a log power spectrum mapping deep neural network (LPS mapping DNN) 14, a denormalizer 15, an inverse fast Fourier transformer 16, and an interpolation circuit 17. The normalizer 10 normalizes a dysarthria voice signal D. The framing circuit 11 divides the dysarthria voice signal D into overlapping frames. Each frame has 256 sampling points and a time length of 16 ms. The short time Fourier transformer 12 extracts frequency-domain information from each frame, wherein the frequency-domain information includes magnitude M and phases 1. The magnitude M is a log power spectrum. The pre-processed LPS mapping DNN 14 converts the magnitude M into reference features M' of a normal person. The reference features M' have better comprehension of voices. The inverse fast Fourier transformer 16 synthesizes the features M' and the phases 1 to generate a voice signal in time domain. Since the frames overlaps to each other, the interpolation circuit 17 interpolates the voice signal to improve the comprehension of the voice signal and generate an intelligent voice signal V. The LPS mapping DNN 14 is trained by a voice training system 2. The voice training system 2 includes a pre-processing circuit 20, a short time Fourier transformer 21, a normalizer 22, and a deep neural network (DNN) trainer 23. The pre-processing circuit 20 uses dynamic time warping (DTW) to align dysarthria corpuses d to reference corpuses r of a normal person and frame the dysarthria corpuses d and the reference corpuses r to generate dysarthria frames and reference frames. Each frame has 256 sampling points and a time length of 16 ms. The short time Fourier transformer 21 respectively extracts dysarthria features Md and reference features Mr from the dysarthria frames and the reference frames. Each feature has 129 sampling points. The normalizer 22 normalizes the dysarthria features Md and the reference features Mr, such that the dysarthria features Md and the reference features Mr easily converge in training. The DNN trainer 23 trains the LPS mapping DNN 14 based on the dysarthria features Md and the reference features Mr. The LPS mapping DNN 14 learns how to convert the dysarthria features Md into the reference features Mr. However, the device 1 for clarifying dysarthria voices causes phase distortion. Presently, the LPS mapping DNN 14 has no better method to convert the phases 1 into the reference features M' for improving comprehension. The conventional technology uses the phases extracted by the short time Fourier transformer 12 or sets all the phases to zero. However, the effect of the conventional technology is bad. The intelligent voice signal V, which is synthesized by the inverse fast Fourier transformer 16 and the interpolation circuit 17 based on the phases 1 and the reference features M' having a mismatch with the phases 1, has obvious noise in hearing. In the conventional technology, another device for clarifying dysarthria voices includes a framing circuit, a short time Fourier transformer, and a pre-processed Wave recurrent neural network (RNN). The framing circuit processes dysarthria voices to generate frames. The short time Fourier transformer extracts log power spectrums having 513 sampling points from each frame and uses the log power spectrums as dysarthria features. The Wave RNN converts the dysarthria features as an intelligent voice signal. The Wave RNN is trained by a voice training system 3, as illustrated in FIG. 3. The voice training system 3 includes a pre-processed circuit 30, a short time Fourier transformer 31, and a voice trainer 32. The pre-processed circuit 30 receives the dysarthria corpuses d and the reference corpuses r of the normal person. The dysarthria corpuses d have 319 sentences. The reference corpuses r also have 319 sentences. The pre-processed circuit 30 uses DTW to align the dysarthria corpuses d to the reference corpuses r. The preprocessed circuit 30 respectively generates dysarthria frames Xd and reference frames Xr based on the dysarthria corpuses d and the reference corpuses r. The short time Fourier transformer 31 extracts from the dysarthria frames Xd log power spectrums as the dysarthria features Md. The voice trainer 32 trains a Wave RNN based on the dysarthria features Md and the reference frames Xr. Although the Wave RNN converts the dysarthria features into the intelligent voice signal to avoid phase distortion, the requirements for aligning the dysarthria features Md with the reference frames Xr are very strict. In general, it has a good effect to use DTW to align the paired voice signals of normal people. It is not ideal to align the dysarthria corpuses d to the reference corpuses r. As a result, the Wave RNN is not directly trained based the dysarthria features Md and the reference frames Xr.

To overcome the abovementioned problems, the present invention provides a device and a method for clarifying dysarthria voices, so as to solve the afore-mentioned problems of the prior art.

SUMMARY OF THE INVENTION

The present invention provides a device and a method for clarifying dysarthria voices, which avoids the phase distortion of the voice signal and provides more natural and clarified voices with low noise.

In an embodiment of the present invention, a device for clarifying dysarthria voices includes a first framing circuit, a first feature extracter, and an intelligent voice converter. The first framing circuit is configured to receive and frame a dysarthria voice signal to generate dysarthria frames. The first feature extracter is coupled to the first framing circuit and configured to receive the dysarthria frames and extract dysarthria features from the dysarthria frames. The intelligent voice converter is coupled to the first feature extracter and configured to receive the dysarthria features. The intelligent voice converter is configured to convert the dysarthria features into an intelligent voice signal based on an intelligent voice conversion model without receiving phases corresponding to the dysarthria features. The intelligent voice conversion model is not trained based on dynamic time warping (DTW).

In an embodiment of the present invention, the intelligent voice conversion model is trained by an intelligent voice training system. The intelligent voice training system includes a second framing circuit, a second feature extracter, a feature mapper, a voice synthesizer, and an intelligent voice trainer. The second framing circuit is configured to receive and frame a dysarthria corpus corresponding to the dysarthria voice signal to generate dysarthria corpus frames. The second feature extracter is coupled to the second framing circuit and configured to receive the dysarthria corpus frames and extract from the dysarthria corpus frames dysarthria corpus features corresponding to the dysarthria features. The feature mapper is coupled to the second feature extracter and configured to receive the dysarthria corpus features and convert the dysarthria corpus features into reference corpus features corresponding to the intelligent voice signal based on a feature mapping model. The voice synthesizer is coupled to the feature mapper and configured to receive the reference corpus features and convert the reference corpus features into reference corpus frames based on a voice synthesizing model. The intelligent voice trainer is coupled to the second feature extracter and the voice synthesizer and configured to receive the reference corpus frames and the dysarthria corpus features and train the intelligent voice conversion model based on the reference corpus frames and the dysarthria corpus features.

In an embodiment of the present invention, the feature mapping model is trained by a feature mapping training system. The feature mapping training system includes a corpus pre-processing circuit, a mapping feature extracter, and a feature mapping trainer. The corpus pre-processing circuit is configured to receive, frame, and align the dysarthria corpus and a reference corpus to generate the dysarthria corpus frames and the reference corpus frames. The dysarthria corpus frames and the reference corpus frames are aligned to each other. The reference corpus corresponds to the intelligent voice signal. The mapping feature extracter is coupled to the corpus pre-processing circuit and configured to receive the dysarthria corpus frames and the reference corpus frames and respectively extract the dysarthria corpus features and the reference corpus features from the dysarthria corpus frames and the reference corpus frames. The feature mapping trainer is coupled to the mapping feature extracter and configured to receive the dysarthria corpus features and the reference corpus features and train the feature mapping model based on the dysarthria corpus features and the reference corpus features.

In an embodiment of the present invention, the voice synthesizing model is trained by a voice synthesizing training system. The voice synthesizing training system includes a third framing circuit, a third feature extracter, and a voice synthesizing trainer. The third framing circuit is configured to receive and frame a reference corpus to generate the reference corpus frames. The reference corpus corresponds to the intelligent voice signal. The third feature extracter is coupled to the third framing circuit and configured to receive the reference corpus frames and extract the reference corpus features from the reference corpus frames. The voice synthesizing trainer is coupled to the third framing circuit and the third feature extracter and configured to receive the reference corpus frames and the reference corpus features and train the voice synthesizing model based on the reference corpus frames and the reference corpus features.

In an embodiment of the present invention, the intelligent voice conversion model includes a feature mapping model and a voice synthesizing model. The intelligent voice converter includes a feature mapper and a voice synthesizer. The feature mapper is coupled to the first feature extracter and configured to receive the dysarthria features and convert the dysarthria features into reference features based on the feature mapping model. The voice synthesizer is coupled to the feature mapper and configured to receive the reference features and convert the reference features into the intelligent voice signal based on the voice synthesizing model.

In an embodiment of the present invention, the feature mapping model is trained by a feature mapping training system. The feature mapping training system includes a corpus pre-processing circuit, a mapping feature extracter, and a feature mapping trainer. The corpus pre-processing circuit is configured to receive, frame, and align a dysarthria corpus and a reference corpus to generate dysarthria corpus frames and reference corpus frames that are aligned to each other. The dysarthria corpus corresponds to the dysarthria voice signal. The reference corpus corresponds to the intelligent voice signal. The mapping feature extracter is coupled to the corpus pre-processing circuit and configured to receive the dysarthria corpus frames and the reference corpus frames and respectively extract dysarthria corpus features and reference corpus features from the dysarthria corpus frames and the reference corpus frames. The dysarthria corpus features and the reference corpus features respectively correspond to the dysarthria features and the reference features. The feature mapping trainer is coupled to the mapping feature extracter and configured to receive the dysarthria corpus features and the reference corpus features and train the feature mapping model based on the dysarthria corpus features and the reference corpus features.

In an embodiment of the present invention, the voice synthesizing model is trained by a voice synthesizing training system. The voice synthesizing training system includes a second framing circuit, a second feature extracter, and a voice synthesizing trainer. The second framing circuit is configured to receive and frame a reference corpus to generate reference corpus frames. The reference corpus corresponds to the intelligent voice signal. The second feature extracter is coupled to the second framing circuit and configured to receive the reference corpus frames and extract reference corpus features corresponding to the reference features from the reference corpus frames. The voice synthesizing trainer is coupled to the second framing circuit and the second feature extracter and configured to receive the reference corpus frames and the reference corpus features and train the voice synthesizing model based on the reference corpus frames and the reference corpus features.

In an embodiment of the present invention, the dysarthria features comprise at least one of a log power spectrum (LPS), a Mel spectrum, a fundamental frequency, a Mel-frequency cepstral coefficient, and an aperiodicity. The intelligent voice conversion model includes a WaveNet or a Wave recurrent neural network (RNN).

In an embodiment of the present invention, the dysarthria features comprise log power spectrums. The intelligent voice converter is configured to convert the dysarthria features into the intelligent voice signal using an inverse Fourier transform.

In an embodiment of the present invention, the dysarthria features comprise a log power spectrum (LPS), a Mel spectrum, a fundamental frequency, a Mel-frequency cepstral coefficient, and an aperiodicity. The intelligent voice converter is a vocoder.

In an embodiment of the present invention, a method for clarifying dysarthria voices includes: receiving and framing a dysarthria voice signal to generate dysarthria frames; receiving the dysarthria frames and extracting dysarthria features from the dysarthria frames; and receiving the dysarthria features and converting the dysarthria features into an intelligent voice signal based on an intelligent voice conversion model without receiving phases corresponding to the dysarthria features; wherein the intelligent voice conversion model is not trained based on dynamic time warping (DTW).

In an embodiment of the present invention, a method for training the intelligent voice conversion model includes: receiving and framing a dysarthria corpus corresponding to the dysarthria voice signal to generate dysarthria corpus frames; receiving the dysarthria corpus frames and extract from the dysarthria corpus frames dysarthria corpus features corresponding to the dysarthria features; receiving the dysarthria corpus features and converting the dysarthria corpus features into reference corpus features corresponding to the intelligent voice signal based on a feature mapping model; receiving the reference corpus features and converting the reference corpus features into reference corpus frames based on a voice synthesizing model; and receiving the reference corpus frames and the dysarthria corpus features and training the intelligent voice conversion model based on the reference corpus frames and the dysarthria corpus features.

In an embodiment of the present invention, a method for training the feature mapping model includes: receiving, framing, and aligning the dysarthria corpus and a reference corpus to generate the dysarthria corpus frames and the reference corpus frames, wherein the dysarthria corpus frames and the reference corpus frames are aligned to each other, and the reference corpus corresponds to the intelligent voice signal; receiving the dysarthria corpus frames and the reference corpus frames and respectively extracting the dysarthria corpus features and the reference corpus features from the dysarthria corpus frames and the reference corpus frames; and receiving the dysarthria corpus features and the reference corpus features and training the feature mapping model based on the dysarthria corpus features and the reference corpus features.

In an embodiment of the present invention, a method for training the voice synthesizing model includes: receiving and framing a reference corpus to generate the reference corpus frames, wherein the reference corpus corresponds to the intelligent voice signal; receiving the reference corpus frames and extracting the reference corpus features from the reference corpus frames; and receiving the reference corpus frames and the reference corpus features and training the voice synthesizing model based on the reference corpus frames and the reference corpus features.

In an embodiment of the present invention, the intelligent voice conversion model includes a feature mapping model and a voice synthesizing model. The step of receiving the dysarthria features and converting the dysarthria features into the intelligent voice signal based on the intelligent voice conversion model without receiving the phases includes: receiving the dysarthria features and converting the dysarthria features into reference features based on the feature mapping model; and receiving the reference features and convert the reference features into the intelligent voice signal based on the voice synthesizing model.

In an embodiment of the present invention, a method for training the feature mapping model includes: receiving, framing, and aligning a dysarthria corpus and a reference corpus to generate dysarthria corpus frames and reference corpus frames that are aligned to each other, wherein the dysarthria corpus corresponds to the dysarthria voice signal, and the reference corpus corresponds to the intelligent voice signal; receiving the dysarthria corpus frames and the reference corpus frames and respectively extracting dysarthria corpus features and reference corpus features from the dysarthria corpus frames and the reference corpus frames, wherein the dysarthria corpus features and the reference corpus features respectively correspond to the dysarthria features and the reference features; and receiving the dysarthria corpus features and the reference corpus features and training the feature mapping model based on the dysarthria corpus features and the reference corpus features.

In an embodiment of the present invention, a method for training the voice synthesizing model includes: receiving and framing a reference corpus to generate reference corpus frames, wherein the reference corpus corresponds to the intelligent voice signal; receiving the reference corpus frames and extracting reference corpus features corresponding to the reference corpus from the reference corpus frames; and receiving the reference corpus frames and the reference corpus features and training the voice synthesizing model based on the reference corpus frames and the reference corpus features.

In an embodiment of the present invention, the dysarthria features include at least one of a log power spectrum (LPS), a Mel spectrum, a fundamental frequency, a Mel-frequency cepstral coefficient, and an aperiodicity. The intelligent voice conversion model includes a WaveNet or a Wave recurrent neural network (RNN).

To sum up, the device and the method for clarifying dysarthria voices convert dysarthria features into an intelligent voice signal based on an intelligent voice conversion model without using an inverse Fourier transform and receiving phases corresponding to the dysarthria features.

Below, the embodiments are described in detail in cooperation with the drawings to make easily understood the technical contents, characteristics and accomplishments of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
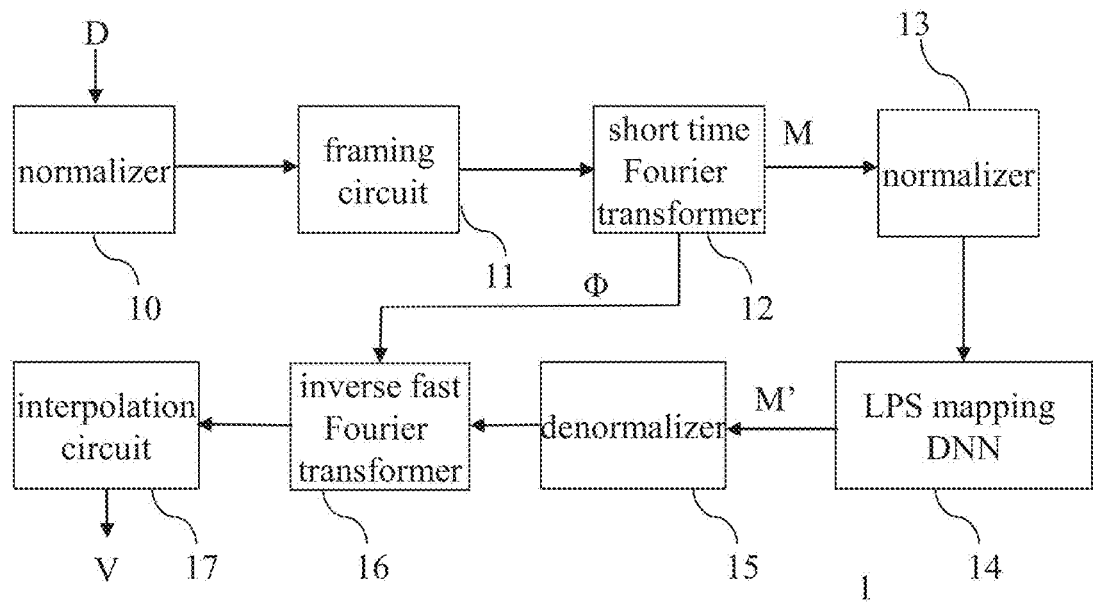
FIG. 1 is a schematic diagram illustrating a device for clarifying dysarthria voices in the conventional technology.
Figure 2:
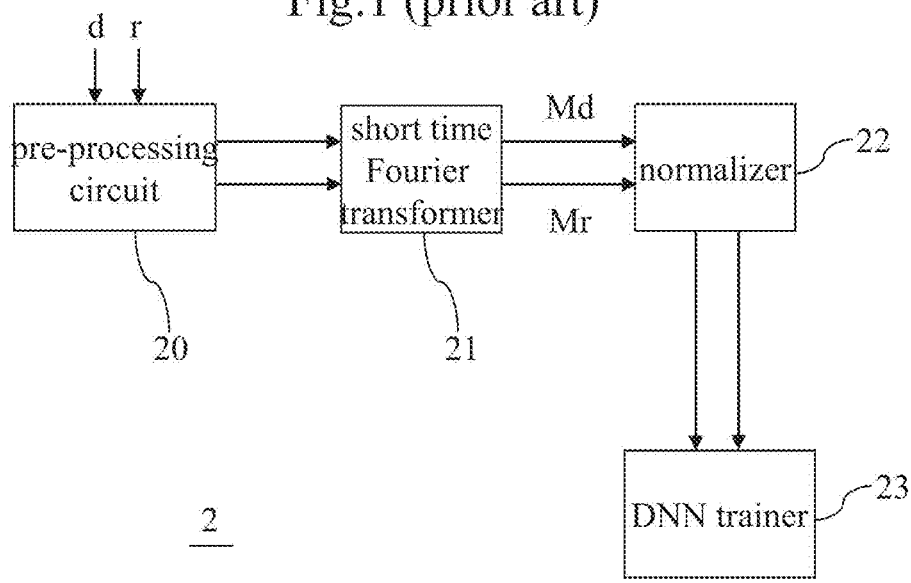
FIG. 2 is a schematic diagram illustrating a voice training system in the conventional technology.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Figure 4:
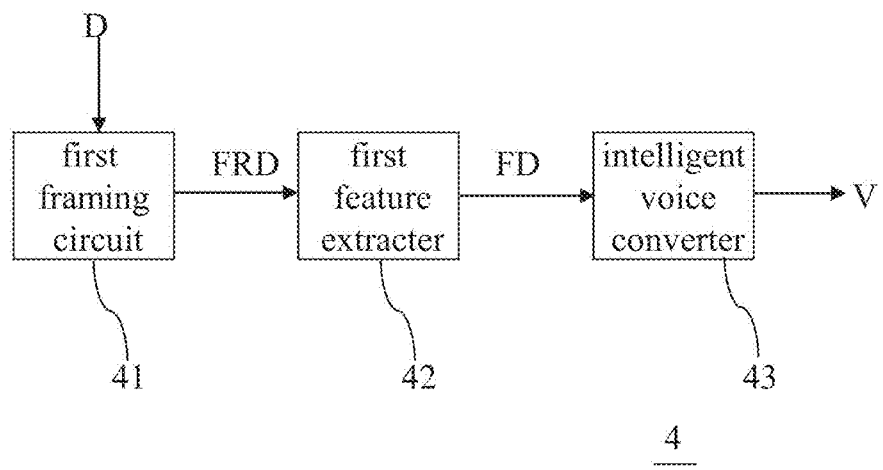
FIG. 4 is a schematic diagram illustrating a device for clarifying dysarthria voices according to an embodiment of the present invention.

FIG. 4 is a schematic diagram illustrating a device for clarifying dysarthria voices according to an embodiment of the present invention. Referring to FIG. 4, an embodiment of the device for clarifying dysarthria voices 4 is introduced as follows. The device for clarifying dysarthria voices 4 does not use an inverse fast Fourier transformer and an interpolation circuit to avoid phase distortion and provide more natural and clarified voices with low noise. The device for clarifying dysarthria voices 4 includes a first framing circuit 41, a first feature extracter 42, and an intelligent voice converter 43. The first feature extracter 42 is coupled to the first framing circuit 41 and the intelligent voice converter 43. The first framing circuit 41 receives and frames a dysarthria voice signal D to generate dysarthria frames FRD. The first feature extracter 42 receives the dysarthria frames FRD and extracts dysarthria features FD from the dysarthria frames FRD. The intelligent voice converter 43 receives the dysarthria features FD. The intelligent voice converter 43 converts the dysarthria features FD into an intelligent voice signal V of normal persons based on an intelligent voice conversion model without receiving phases corresponding to the dysarthria features FD. Besides, the intelligent voice conversion model is not trained based on dynamic time warping (DTW). The dysarthria features FD include at least one of a log power spectrum (LPS), a Mel spectrum, a fundamental frequency, a Mel-frequency cepstral coefficient, and an aperiodicity. The intelligent voice conversion model may be implemented with a neural network, such as a WaveNet or a Wave recurrent neural network (RNN). For example, when the dysarthria features FD include log power spectrums, the intelligent voice converter 43 is implemented with an Inverse Fourier transformer that transforms the dysarthria features FD into the intelligent voice signal V. When the dysarthria features FD include a Mel spectrum, a fundamental frequency, a Mel-frequency cepstral coefficient, and an aperiodicity, the intelligent voice converter 43 is implemented with a vocoder.

Figure 5:
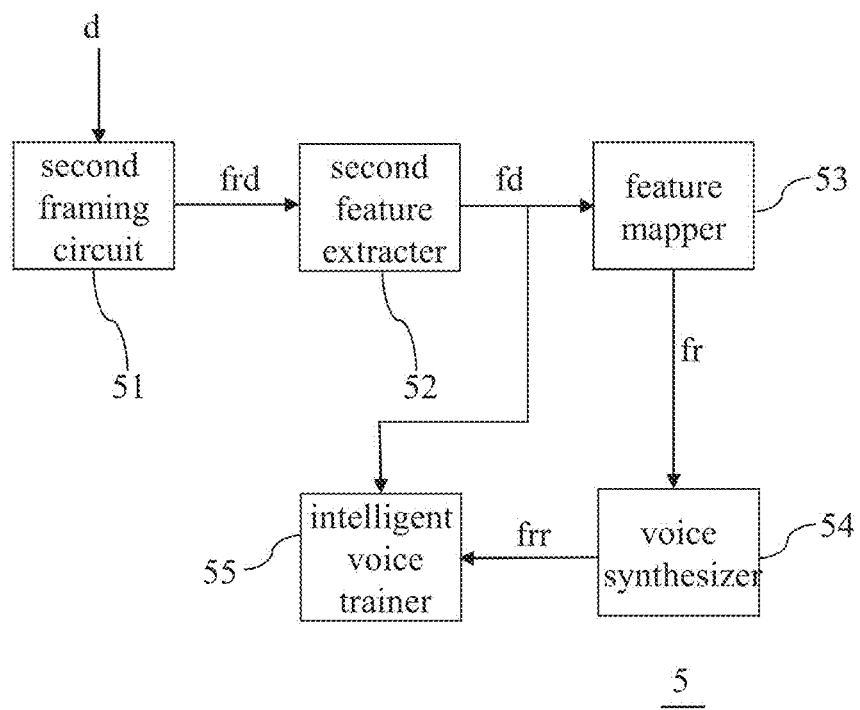
FIG. 5 is a schematic diagram illustrating an intelligent voice training system according to an embodiment of the present invention.

The intelligent voice conversion model is trained by an intelligent voice training system. FIG. 5 is a schematic diagram illustrating an intelligent voice training system according to an embodiment of the present invention. Referring to FIG. 4 and FIG. 5, the intelligent voice training system 5 may include a second framing circuit 51, a second feature extracter 52, a feature mapper 53, a voice synthesizer 54, and an intelligent voice trainer 55. The second feature extracter 52 is coupled to the second framing circuit 51. The feature mapper 53 is coupled to the second feature extracter 52. The voice synthesizer 54 is coupled to the feature mapper 53. The intelligent voice trainer 55 is coupled to the second feature extracter 52 and the voice synthesizer 54. The second framing circuit 51 receives and frames a dysarthria corpus d corresponding to the dysarthria voice signal D to generate dysarthria corpus frames frd. The second feature extracter 52 receives the dysarthria corpus frames frd and extract from the dysarthria corpus frames frd dysarthria corpus features fd corresponding to the dysarthria features FD. The feature mapper 53 receives the dysarthria corpus features fd and converts the dysarthria corpus features fd into reference corpus features fr corresponding to the intelligent voice signal V based on a feature mapping model. The voice synthesizer 54 receives the reference corpus features fr and converts the reference corpus features fr into reference corpus frames frr based on a voice synthesizing model. The intelligent voice trainer 55 receives the reference corpus frames frr and the dysarthria corpus features fd and trains the intelligent voice conversion model based on the reference corpus frames frr and the dysarthria corpus features fd. The feature mapping model and the voice synthesizing model are implemented with WaveNets or Wave recurrent neural networks (RNNs).

Figure 6:
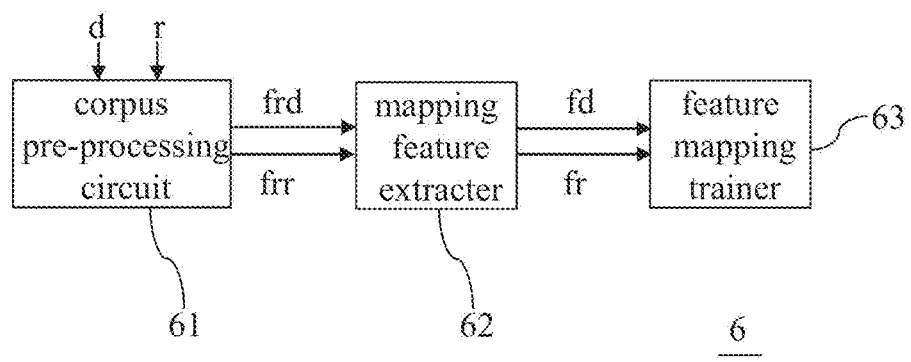
FIG. 6 is a schematic diagram illustrating a feature mapping training system according to an embodiment of the present invention.

The feature mapping model is trained by a feature mapping training system. FIG. 6 is a schematic diagram illustrating a feature mapping training system according to an embodiment of the present invention. Referring to FIG. 4 and FIG. 6, the feature mapping training system 6 may include a corpus pre-processing circuit 61, a mapping feature extracter 62, and a feature mapping trainer 63. The mapping feature extracter 62 may be a short time Fourier transformer (STFT), but the present invention is not limited thereto. The mapping feature extracter 62 is coupled to the corpus pre-processing circuit 61 and the feature mapping trainer 63. The corpus pre-processing circuit 61 receives, frames, and aligns the dysarthria corpus d and a reference corpus r to generate the dysarthria corpus frames frd and the reference corpus frames frr. The dysarthria corpus frames frd and the reference corpus frames frr are aligned to each other. The reference corpus r corresponds to the intelligent voice signal V. The mapping feature extracter 62 receives the dysarthria corpus frames frd and the reference corpus frames frr and respectively extracts the dysarthria corpus features fd and the reference corpus features fr from the dysarthria corpus frames frd and the reference corpus frames frr. The feature mapping trainer 63 receives the dysarthria corpus features fd and the reference corpus features fr and train the feature mapping model based on the dysarthria corpus features fd and the reference corpus features fr.

Figure 7:
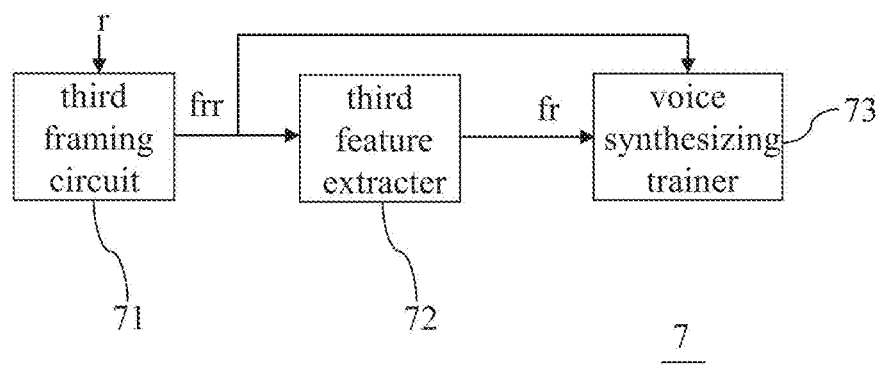
FIG. 7 is a schematic diagram illustrating a voice synthesizing training system according to an embodiment of the present invention.

The voice synthesizing model is trained by a voice synthesizing training system. FIG. 7 is a schematic diagram illustrating a voice synthesizing training system according to an embodiment of the present invention. Referring to FIG. 4 and FIG. 7, the voice synthesizing training system 7 may include a third framing circuit 71, a third feature extracter 72, and a voice synthesizing trainer 73. The third framing circuit 71 is coupled to the third feature extracter 72 and the voice synthesizing trainer 73. The third feature extracter 72 is coupled to the voice synthesizing trainer 73. The third framing circuit 71 receives and frames a reference corpus r to generate the reference corpus frames frr. The reference corpus r corresponds to the intelligent voice signal V. The third feature extracter 72 receives the reference corpus frames frr and extracts the reference corpus features fr from the reference corpus frames frr. The voice synthesizing trainer 73 receives the reference corpus frames frr and the reference corpus features fr and trains the voice synthesizing model based on the reference corpus frames frr and the reference corpus features fr. Since the reference corpus frames frr and the reference corpus features fr come from the reference corpus r, the reference corpus frames frr and the reference corpus features fr are automatically aligned to each other.

Figure 8:
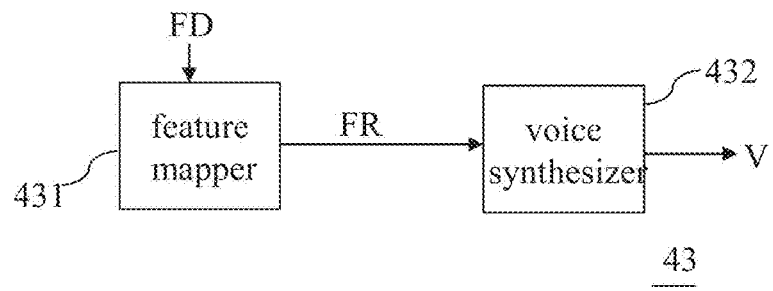
FIG. 8 is a schematic diagram illustrating an intelligent voice converter according to an embodiment of the present invention.

FIG. 8 is a schematic diagram illustrating an intelligent voice converter according to an embodiment of the present invention. Referring to FIG. 4 and FIG. 8, the intelligent voice converter 43 is introduced as follows. In some embodiment of the present invention, the intelligent voice converter 43 may include a feature mapper 431 and a voice synthesizer 432. The intelligent voice conversion model may include a feature mapping model and a voice synthesizing model. The feature mapping model and the voice synthesizing model are implemented with neural networks, such as WaveNets or Wave recurrent neural networks (RNNs). The feature mapper 431 is coupled to the first feature extracter 42 and the voice synthesizer 432. The feature mapper 431 receives the dysarthria features FD and converts the dysarthria features FD into reference features FR of normal persons based on the feature mapping model. The voice synthesizer 432 receives the reference features FR and converts the reference features FR into the intelligent voice signal V based on the voice synthesizing model.

Figure 9:
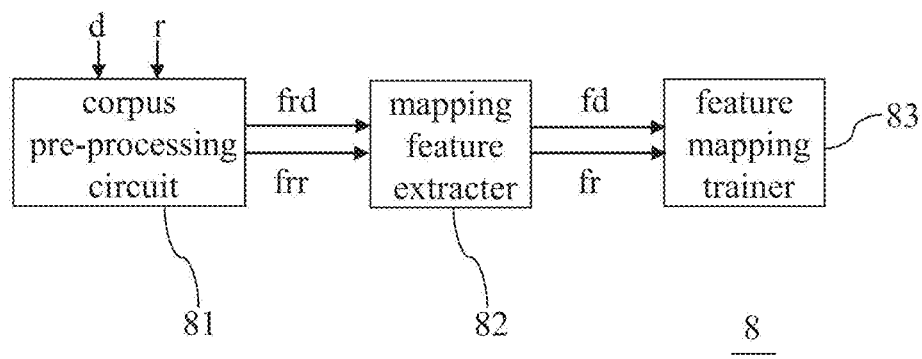
FIG. 9 is a schematic diagram illustrating another feature mapping training system according to an embodiment of the present invention.

FIG. 9 is a schematic diagram illustrating another feature mapping training system according to an embodiment of the present invention. The feature mapping model of FIG. 8 is trained by a feature mapping training system. Referring to FIG. 8 and FIG. 9, the feature mapping training system 8 may include a corpus pre-processing circuit 81, a mapping feature extracter 82, and a feature mapping trainer 83. The mapping feature extracter 82 may be implemented with a short time Fourier transformer (STFT), but the present invention is not limited thereto. The mapping feature extracter 82 is coupled to the corpus pre-processing circuit 81 and the feature mapping trainer 83. The corpus pre-processing circuit 81 receives, frames, and aligns a dysarthria corpus d and a reference corpus r to generate dysarthria corpus frames frd and reference corpus frames frr that are aligned to each other. The dysarthria corpus d corresponds to the dysarthria voice signal D. The reference corpus r corresponds to the intelligent voice signal V. The mapping feature extracter 82 receives the dysarthria corpus frames frd and the reference corpus frames frr and respectively extracts dysarthria corpus features fd and reference corpus features fr from the dysarthria corpus frames frd and the reference corpus frames frr. The dysarthria corpus features fd and the reference corpus features fr respectively correspond to the dysarthria features FD and the reference features FR. The feature mapping trainer 83 receives the dysarthria corpus features fd and the reference corpus features fr and trains the feature mapping model based on the dysarthria corpus features fd and the reference corpus features fr.

Figure 10:
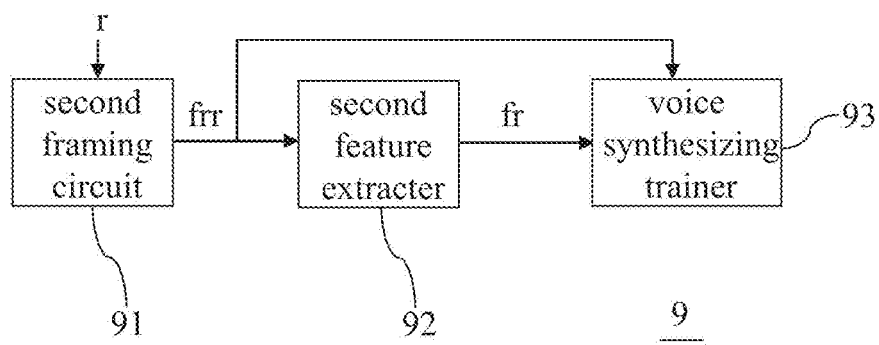
FIG. 10 is a schematic diagram illustrating another voice synthesizing training system according to an embodiment of the present invention.

FIG. 10 is a schematic diagram illustrating another voice synthesizing training system according to an embodiment of the present invention. The voice synthesizing model of FIG. 8 is trained by a voice synthesizing training system. Referring to FIG. 8 and FIG. 10, the voice synthesizing training system 9 is extraneous to the dysarthria voice signal D. The voice synthesizing training system 9 may include a second framing circuit 91, a second feature extracter 92, and a voice synthesizing trainer 93. The second feature extracter 92 is coupled to the second framing circuit 91 and the voice synthesizing trainer 93. The second framing circuit 91 receives and frames a reference corpus r to generate reference corpus frames frr. The reference corpus r corresponds to the intelligent voice signal V. The second feature extracter 92 receives the reference corpus frames frr and extract reference corpus features fr corresponding to the reference features FR from the reference corpus frames frr. The voice synthesizing trainer 93 receives the reference corpus frames frr and the reference corpus features fr and trains the voice synthesizing model based on the reference corpus frames frr and the reference corpus features fr.

The performance of four implementations is compared and introduced as follows. For example, the dysarthria features are implemented with a log power spectrum. The dysarthria voice signal is framed with a sampling rate of 16000 sample points/seconds. As a result, each dysarthria frame includes 1024 sample points and a length of the integer power of 2 to use a fast Fourier transform. In order to prevent information between the neighboring dysarthria frames from varying too much, the dysarthria frames are overlapped to calculate the next dysarthria frame. Thus, the hop size of the dysarthria frames is set to 256 sample points.

The STFT extracts a log power spectrum with 513 sample points as the dysarthria features from each dysarthria frame with 1024 sample points.

The first implementation is implemented with the device 1 for clarifying dysarthria voices of FIG. 1, wherein the dysarthria features include a log power spectrum with 513 sample points. The LPS mapping DNN 14 is implemented with a fully-connected deep neural network (FCDNN), which includes an input layer with 513 sample points, three hiding layers with 1024 sample points, and an output layer with 513 sample points. The FCDNN is trained by the dysarthria corpus d and the reference corpus r, wherein the dysarthria corpus d and the reference corpus r are aligned to each other by DTW. Each frame of the trained data has a time length of 64 ms and overlaps to each other, wherein the hop size of the frames is 16 sample points.

In the second implementation, the fast Fourier transformer 16 and the interpolation circuit 17 of the device 1 for clarifying dysarthria voices of FIG. 1 are replaced with the voice synthesizer 432 of FIG. 8. The dysarthria features include a log power spectrum with 513 sample points. The LPS mapping DNN 14 is implemented with a 513×1024× 1024×1024×513 fully-connected deep neural network (FCDNN). The voice synthesizer 432 is implemented with a WaveRNN. The WaveRNN is trained by the reference corpus features and the reference corpus frames that are aligned to the reference corpus features. The reference corpus features and the reference corpus frames are generated due to the reference corpus with 319 sentences. The reference corpus frames overlap each other. Each reference corpus frame has a time length of 64 ms. The hop size of the reference corpus frames is 256 sample points.

Figure 3:
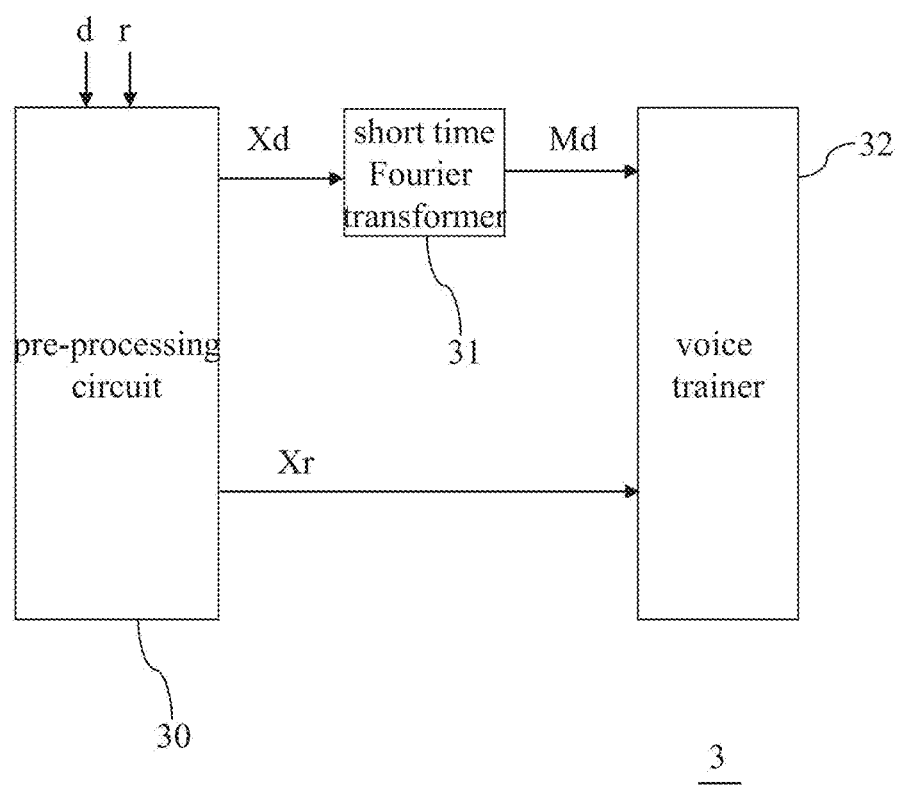
FIG. 3 is a schematic diagram illustrating another voice training system in the conventional technology.

The third implementation is implemented with a device for clarifying dysarthria voices that includes a framing circuit, a short time Fourier transformer, and a pre-trained WaveRNN. The framing circuit processes dysarthria voices to generate frames. The short time Fourier transformer extracts from each frame a log power spectrum with 513 sample points as dysarthria features. The WaveRNN converts the dysarthria features into an intelligent voice signal. The WaveRNN is trained by the voice training system 3 of FIG. 3.

Figure 11:
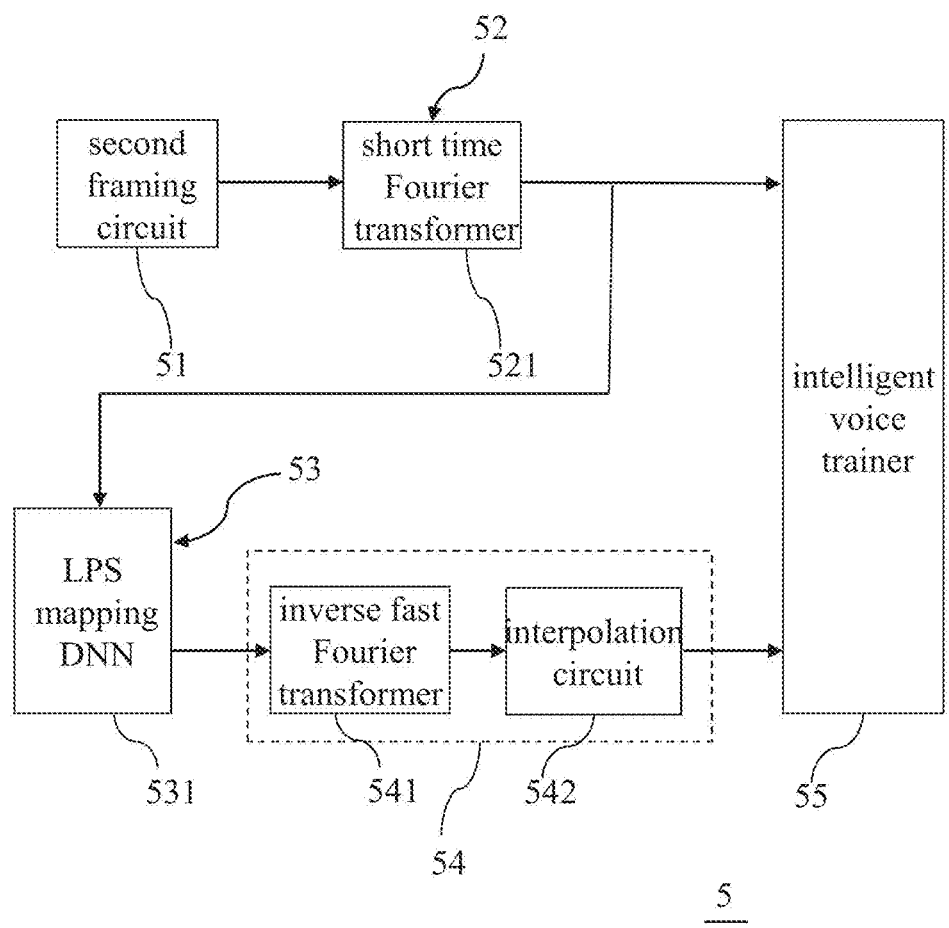
FIG. 11 is a schematic diagram illustrating another intelligent voice training system according to an embodiment of the present invention.

The fourth implementation is implemented with a device 4 for clarifying dysarthria voices of FIG. 4. The intelligent voice conversion model is trained by an intelligent voice training system 5 of FIG. 11. The second feature extracter 52 is implemented with a short time Fourier transformer 521. The feature mapper 52 is implemented with a log power spectrum mapping deep neural network (LPS mapping DNN) 531. The voice synthesizer 54 is implemented with an inverse fast Fourier transformer 541 and an interpolation circuit 542 that are coupled to each other.

Figure 12:
FIG. 12 is a diagram illustrating a waveform of a dysarthria voice signal according to an embodiment of the present invention.
Figure 13:
FIG. 13 is a diagram illustrating a waveform of a reference voice signal of a normal person according to an embodiment of the present invention.
Figure 14:
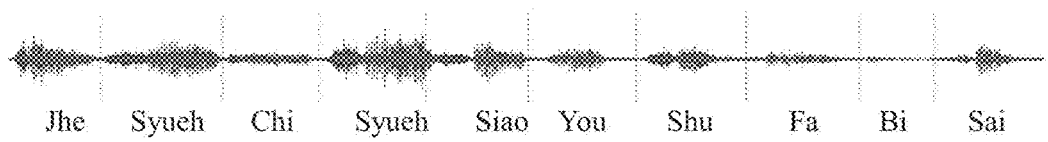
FIG. 14 is a diagram illustrating a waveform of an intelligent voice signal corresponding to a first implementation.
Figure 15:
FIG. 15 is a diagram illustrating a waveform of an intelligent voice signal corresponding to a second implementation.
Figure 16:
FIG. 16 is a diagram illustrating a waveform of an intelligent voice signal corresponding to a third implementation.
Figure 17:
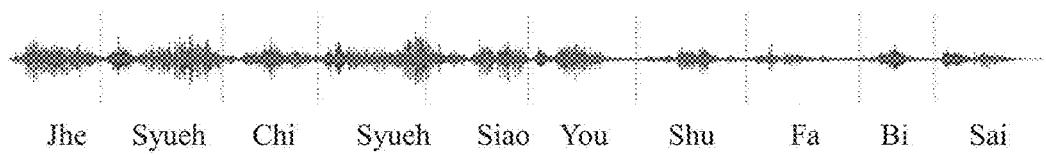
FIG. 17 is a diagram illustrating a waveform of an intelligent voice signal corresponding to a fourth implementation.
Figure 18:
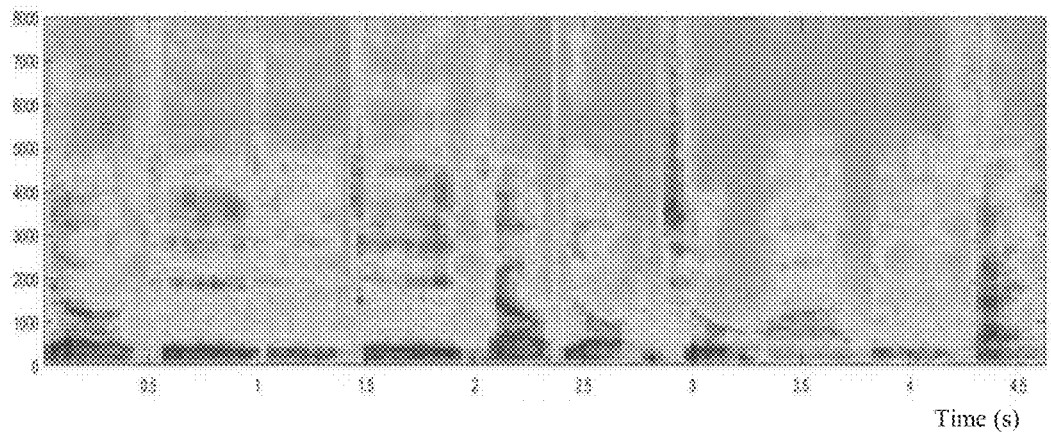
FIG. 18 is a diagram illustrating a spectrum of a dysarthria voice signal according to an embodiment of the present invention.
Figure 19:
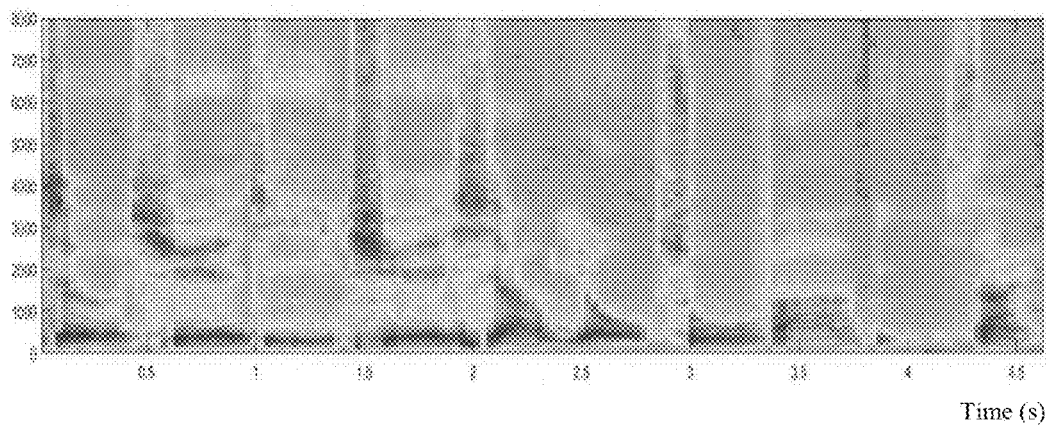
FIG. 19 is a diagram illustrating a spectrum of a reference voice signal of a normal person according to an embodiment of the present invention.
Figure 20:
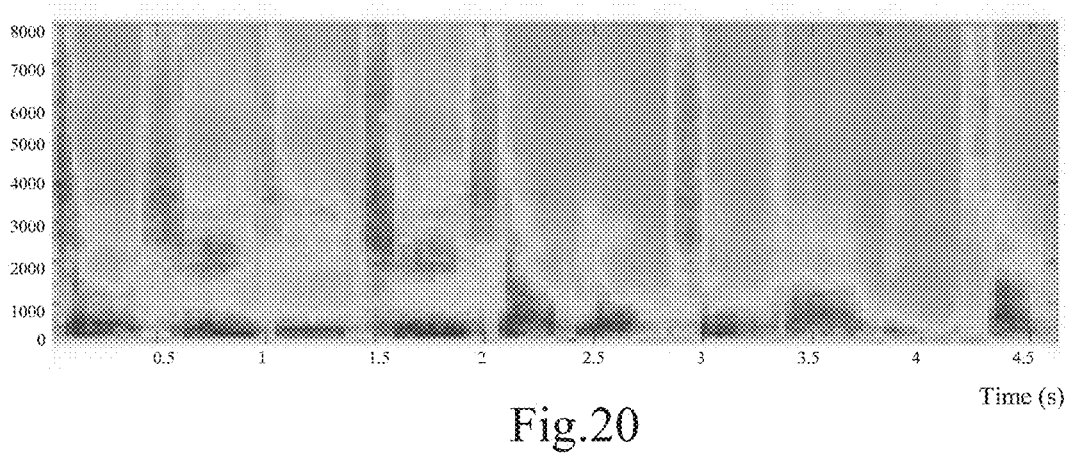
FIG. 20 is a diagram illustrating a spectrum of an intelligent voice signal corresponding to the first implementation.
Figure 21:
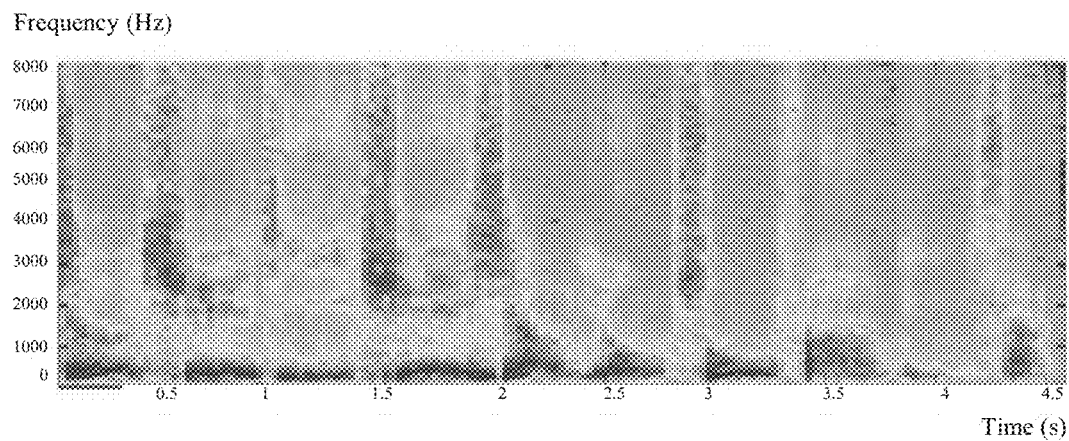
FIG. 21 is a diagram illustrating a spectrum of an intelligent voice signal corresponding to the second implementation.
Figure 22:
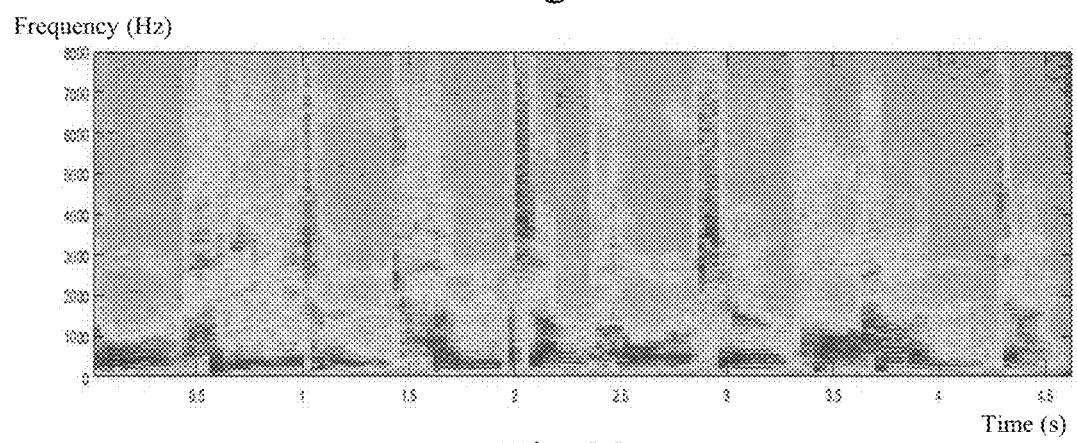
FIG. 22 is a diagram illustrating a spectrum of an intelligent voice signal corresponding to the third implementation.
Figure 23:
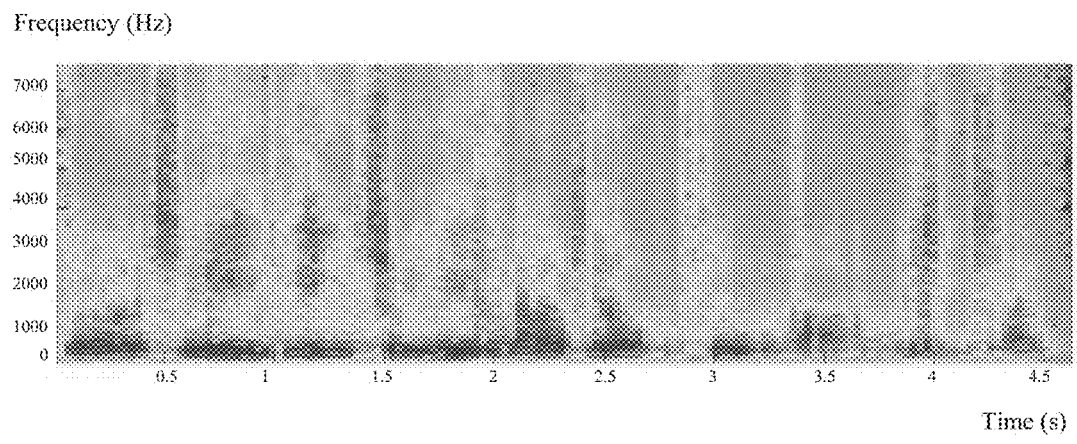
FIG. 23 is a diagram illustrating a spectrum of an intelligent voice signal corresponding to the fourth implementation.

FIG. 12 is a diagram illustrating a waveform of a dysarthria voice signal according to an embodiment of the present invention. FIG. 13 is a diagram illustrating a waveform of a reference voice signal of a normal person according to an embodiment of the present invention. FIG. 14 is a diagram illustrating a waveform of an intelligent voice signal corresponding to a first implementation. FIG. 15 is a diagram illustrating a waveform of an intelligent voice signal corresponding to a second implementation. FIG. 16 is a diagram illustrating a waveform of an intelligent voice signal corresponding to a third implementation. FIG. 17 is a diagram illustrating a waveform of an intelligent voice signal corresponding to a fourth implementation. FIG. 18 is a diagram illustrating a spectrum of a dysarthria voice signal according to an embodiment of the present invention. FIG. 19 is a diagram illustrating a spectrum of a reference voice signal of a normal person according to an embodiment of the present invention. FIG. 20 is a diagram illustrating a spectrum of an intelligent voice signal corresponding to the first implementation. FIG. 21 is a diagram illustrating a spectrum of an intelligent voice signal corresponding to the second implementation. FIG. 22 is a diagram illustrating a spectrum of an intelligent voice signal corresponding to the third implementation. FIG. 23 is a diagram illustrating a spectrum of an intelligent voice signal corresponding to the fourth implementation. From FIG. 12 and FIG. 18, it is known that normal persons difficultly understand the dysarthria voice signal. After listening to the dysarthria voice signal a few times, normal persons can understand the dysarthria voice signal. From FIG. 13 and FIG. 19, it is known that normal persons can understand the dysarthria voice signal. From FIG. 14 and FIG. 20, it is known that the first implementation improves the voice comprehension of the dysarthria voice signal. However, the intelligent voice signal has many noises such that the feeling is bad in hearing. As illustrated in FIG. 15 and FIG. 21, the intelligent voice signal of the second implementation lacks noise compared with the first implementation. Thus, the second implementation has a better feeling in hearing. From FIG. 15 and FIG. 22, it is known that the intelligent voice signal of the third implementation is like the reference voice signal. However, normal persons do not still understand the intelligent voice signal of the third implementation. This is because the DTW has limited abilities for aligning frames to cause the bad voice conversion effect of the WaveRNN. From FIG. 17 and FIG. 23, it is known that the intelligent voice signals of the fourth implementation and the second implementation have similar hearing effect.

According to the embodiments provided above, the device and the method for clarifying dysarthria voices convert dysarthria features into an intelligent voice signal based on an intelligent voice conversion model without using an inverse Fourier transform and receiving phases corresponding to the dysarthria features.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A device for clarifying dysarthria voices comprising: one or more first processors configured to:
    receive and frame a dysarthria voice signal to generate dysarthria frames;
    extract dysarthria features from the dysarthria frames; and
    convert the dysarthria features into an intelligent voice signal based on an intelligent voice conversion model without receiving phases corresponding to the dysarthria features;
    wherein the intelligent voice conversion model is not trained based on dynamic time warping (DTW);
    wherein the intelligent voice conversion model is trained by an intelligent voice training system, and the intelligent voice training system comprises:
        one or more second processors configured to:
            receive and frame a dysarthria corpus corresponding to the dysarthria voice signal to generate dysarthria corpus frames;
            extract from the dysarthria corpus frames dysarthria corpus features corresponding to the dysarthria features;
            convert the dysarthria corpus features into reference corpus features corresponding to the intelligent voice signal based on a feature mapping model;
            convert the reference corpus features into reference corpus frames based on a voice synthesizing model; and
            train the intelligent voice conversion model based on the reference corpus frames and the dysarthria corpus features.

2. The device for clarifying dysarthria voices according to claim 1, wherein the feature mapping model is trained by a feature mapping training system, and the feature mapping training system comprises:
    one or more third processors configured to:
        receive, frame, and align the dysarthria corpus and a reference corpus to generate the dysarthria corpus frames and the reference corpus frames, wherein the dysarthria corpus frames and the reference corpus frames are aligned to each other, and the reference corpus corresponds to the intelligent voice signal;
        respectively extract the dysarthria corpus features and the reference corpus features from the dysarthria corpus frames and the reference corpus frames; and
        train the feature mapping model based on the dysarthria corpus features and the reference corpus features.

3. The device for clarifying dysarthria voices according to claim 1, wherein the voice synthesizing model is trained by a voice synthesizing training system, and the voice synthesizing training system comprises:
    one or more third processors configured to:
        receive and frame a reference corpus to generate the reference corpus frames, wherein the reference corpus corresponds to the intelligent voice signal;
        extract the reference corpus features from the reference corpus frames; and
        train the voice synthesizing model based on the reference corpus frames and the reference corpus features.

4. The device for clarifying dysarthria voices according to claim 1, wherein the intelligent voice conversion model comprises a feature mapping model and a voice synthesizing model, and the first processor is configured to:
    convert the dysarthria features into reference features based on the feature mapping model; and
    convert the reference features into the intelligent voice signal based on the voice synthesizing model.

5. The device for clarifying dysarthria voices according to claim 4, wherein the feature mapping model is trained by a feature mapping training system, and the feature mapping training system comprises:
    one or more third processors configured to:
        receive, frame, and align a dysarthria corpus and a reference corpus to generate dysarthria corpus frames and reference corpus frames that are aligned to each other, wherein the dysarthria corpus corresponds to the dysarthria voice signal, and the reference corpus corresponds to the intelligent voice signal;
        respectively extract dysarthria corpus features and reference corpus features from the dysarthria corpus frames and the reference corpus frames, wherein the dysarthria corpus features and the reference corpus features respectively correspond to the dysarthria features and the reference features; and train the feature mapping model based on the dysarthria corpus features and the reference corpus features.

6. The device for clarifying dysarthria voices according to claim 4, wherein the voice synthesizing model is trained by a voice synthesizing training system, and the voice synthesizing training system comprises:
one or more third processors configured to:
receive and frame a reference corpus to generate reference corpus frames, wherein the reference corpus corresponds to the intelligent voice signal;
extract reference corpus features corresponding to the reference features from the reference corpus frames; and
train the voice synthesizing model based on the reference corpus frames and the reference corpus features.

7. The device for clarifying dysarthria voices according to claim 1, wherein the dysarthria features comprise at least one of a log power spectrum (LPS), a Mel spectrum, a fundamental frequency, a Mel-frequency cepstral coefficient, and an aperiodicity, and the intelligent voice conversion model comprises a WaveNet or a Wave recurrent neural network (RNN).

8. The device for clarifying dysarthria voices according to claim 1, wherein the dysarthria features comprise log power spectrums, and the intelligent voice converter is configured to convert the dysarthria features into the intelligent voice signal using an inverse Fourier transform.

9. The device for clarifying dysarthria voices according to claim 1, wherein the dysarthria features comprise a log power spectrum (LPS), a Mel spectrum, a fundamental frequency, a Mel-frequency cepstral coefficient, and an aperiodicity, and the intelligent voice converter is a vocoder.

10. A method for clarifying dysarthria voices comprising:
receiving and framing a dysarthria voice signal to generate dysarthria frames;
receiving the dysarthria frames and extracting dysarthria features from the dysarthria frames; and
receiving the dysarthria features and converting the dysarthria features into an intelligent voice signal based on an intelligent voice conversion model without receiving phases corresponding to the dysarthria features;
wherein the intelligent voice conversion model is not trained based on dynamic time warping (DTW);
wherein a method for training the intelligent voice conversion model comprises:
receiving and framing a dysarthria corpus corresponding to the dysarthria voice signal to generate dysarthria corpus frames;
receiving the dysarthria corpus frames and extract from the dysarthria corpus frames dysarthria corpus features corresponding to the dysarthria features;
receiving the dysarthria corpus features and converting the dysarthria corpus features into reference corpus features corresponding to the intelligent voice signal based on a feature mapping model;
receiving the reference corpus features and converting the reference corpus features into reference corpus frames based on a voice synthesizing model; and
receiving the reference corpus frames and the dysarthria corpus features and training the intelligent voice conversion model based on the reference corpus frames and the dysarthria corpus features.

11. The method for clarifying dysarthria voices according to claim 10, wherein a method for training the feature mapping model comprises:
receiving, framing, and aligning the dysarthria corpus and a reference corpus to generate the dysarthria corpus frames and the reference corpus frames, wherein the dysarthria corpus frames and the reference corpus frames are aligned to each other, and the reference corpus corresponds to the intelligent voice signal;
receiving the dysarthria corpus frames and the reference corpus frames and respectively extracting the dysarthria corpus features and the reference corpus features from the dysarthria corpus frames and the reference corpus frames; and
receiving the dysarthria corpus features and the reference corpus features and training the feature mapping model based on the dysarthria corpus features and the reference corpus features.

12. The method for clarifying dysarthria voices according to claim 10, wherein a method for training the voice synthesizing model comprises:
receiving and framing a reference corpus to generate the reference corpus frames, wherein the reference corpus corresponds to the intelligent voice signal;
receiving the reference corpus frames and extracting the reference corpus features from the reference corpus frames; and
receiving the reference corpus frames and the reference corpus features and training the voice synthesizing model based on the reference corpus frames and the reference corpus features.

13. The method for clarifying dysarthria voices according to claim 10, wherein the intelligent voice conversion model comprises a feature mapping model and a voice synthesizing model, and the step of receiving the dysarthria features and converting the dysarthria features into the intelligent voice signal based on the intelligent voice conversion model without receiving the phases comprises:
receiving the dysarthria features and converting the dysarthria features into reference features based on the feature mapping model; and
receiving the reference features and convert the reference features into the intelligent voice signal based on the voice synthesizing model.

14. The method for clarifying dysarthria voices according to claim 13, wherein a method for training the feature mapping model comprises:
receiving, framing, and aligning a dysarthria corpus and a reference corpus to generate dysarthria corpus frames and reference corpus frames that are aligned to each other, wherein the dysarthria corpus corresponds to the dysarthria voice signal, and the reference corpus corresponds to the intelligent voice signal;
receiving the dysarthria corpus frames and the reference corpus frames and respectively extracting dysarthria corpus features and reference corpus features from the dysarthria corpus frames and the reference corpus frames, wherein the dysarthria corpus features and the reference corpus features respectively correspond to the dysarthria features and the reference features; and
receiving the dysarthria corpus features and the reference corpus features and training the feature mapping model based on the dysarthria corpus features and the reference corpus features.

15. The method for clarifying dysarthria voices according to claim 13, wherein a method for training the voice synthesizing model comprises:
receiving and framing a reference corpus to generate reference corpus frames, wherein the reference corpus corresponds to the intelligent voice signal;

receiving the reference corpus frames and extracting reference corpus features corresponding to the reference corpus from the reference corpus frames; and receiving the reference corpus frames and the reference corpus features and training the voice synthesizing model based on the reference corpus frames and the reference corpus features.

16. The method for clarifying dysarthria voices according to claim 10, wherein the dysarthria features comprise at least one of a log power spectrum (LPS), a Mel spectrum, a fundamental frequency, a Mel-frequency cepstral coefficient, and an aperiodicity, and the intelligent voice conversion model comprises a WaveNet or a Wave recurrent neural network (RNN).

* * * * *